UNITED STATES PATENT OFFICE.

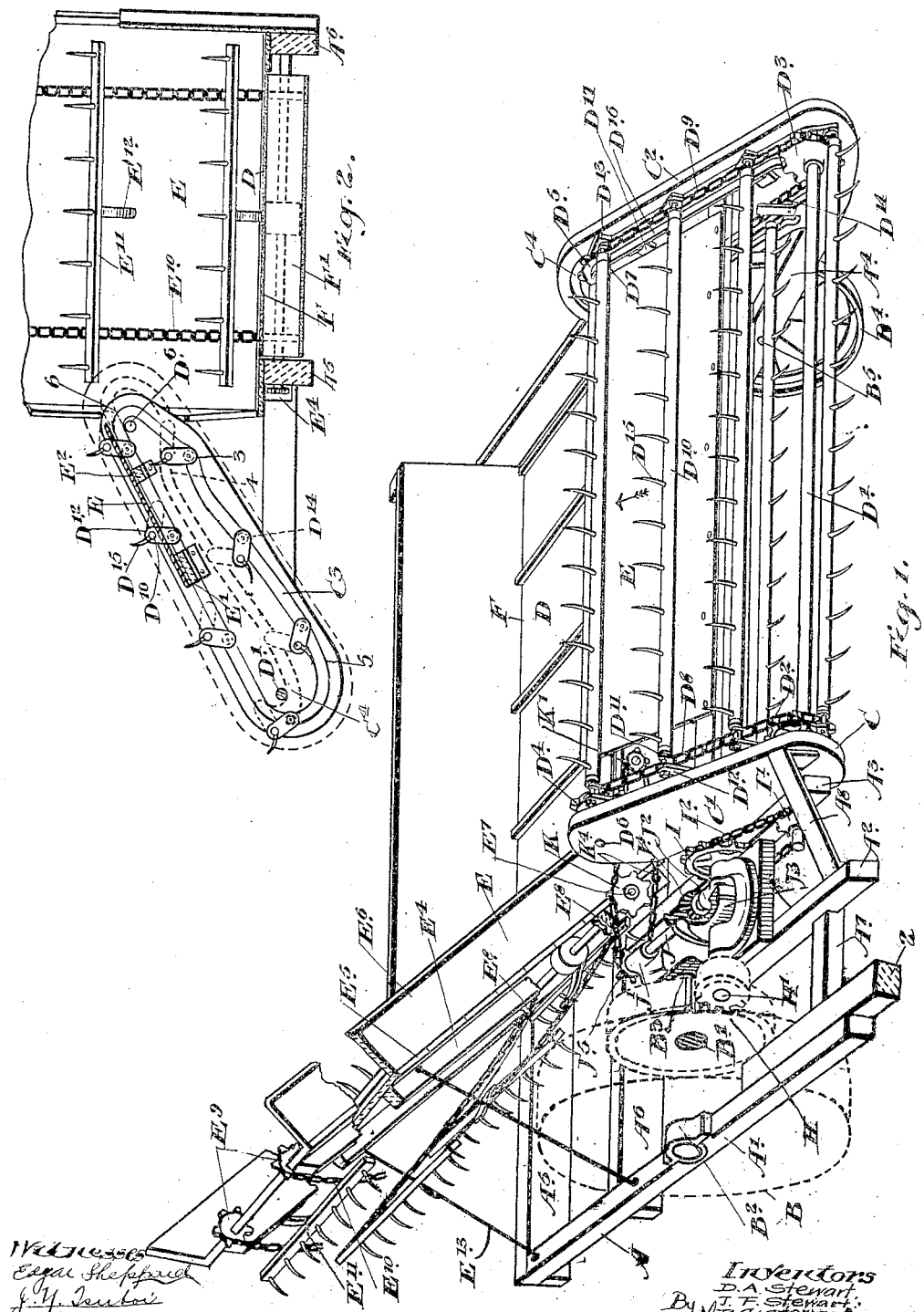

DAVID ALBERT STEWART, JOHN FERGUSON STEWART, AND ROBERT CHARLES STEWART, OF MOLESWORTH, ONTARIO, CANADA.

LOADER FOR SHOCKS OR SHEAVES OF GRAIN.

No. 865,446.     Specification of Letters Patent.     Patented Sept. 10, 1907.

Application filed November 21, 1905. Serial No. 288,477.

*To all whom it may concern:*

Be it known that we, DAVID ALBERT STEWART, manufacturer, JOHN FERGUSON STEWART, farmer, and ROBERT CHARLES STEWART, manufacturer, all of the village of Molesworth, in the county of Huron, in the Province of Ontario, Canada, have invented certain new and useful Improvements in Loaders for Shocks or Sheaves of Grain, of which the following is a specification.

Our invention relates to improvements in loaders for shocks or sheaves of grain and the object of the invention is to provide a simple, durable, light and convenient loader whereby shocks or sheaves of grain may be automatically gathered off the ground and conveyed on to the load as the wagon or other vehicle travels over the field, and it consists essentially of a substantially rectangular main frame, a supporting wheel located at each side of the frame, a forwardly extending tongue located to one side of the frame, an elevating carrier located to the front of and extending laterally across the frame and consisting of side boards having cam grooves therein, a pair of upper and lower sprocket wheels and connecting chains located at the side of each board, pronged cross bars pivotally connected to the links of the chains and arms provided with rollers forming part of the pronged bars and designed to coact with the cam grooves to give the required motion to the pronged bars and suitable endless conveyers to receive the sheaves to convey them on to the load, as hereinafter more particularly described by the following specification.

Figure 1, is a general perspective view of our loader. Fig. 2, is a longitudinal sectional view through Fig. 1.

In the drawings like letters of reference indicate corresponding parts in each figure.

A is the main frame, consisting of the longitudinal timbers $A'$ $A^2$ $A^3$ and $A^4$, the cross timbers $A^5$ and $A^6$ and the cross connecting bars $A^7$ $A^8$.

B is the main supporting wheel (indicated by dotted lines in Fig. 1), the shaft $B'$ of which is journaled in the bearings $B^2$ $B^3$.

$B^4$ is a wheel journaled on the stud $B^5$ secured in the bar $A^4$ of the frame and 2 is the tongue by which the machine is drawn forwardly.

C is the elevating carrier designed to raise the sheaf off the ground so as to lift it onto the endless conveyer D which carries the sheaf to the elevating conveyer E. The conveyer E conveys the sheaf onto the load.

$C'$ $C^2$ are the side boards of the elevating carrier C provided on their inner surface with cam grooves $C^3$ $C^4$. The paths of the grooves differ in direction as shown in Fig. 2 of the drawing, the groove $C^3$ being shown by full lines and the groove $C^4$ by dotted lines.

The side boards $C'$ $C^2$ are suitably connected to the timbers $A^5$ and $A^6$ of the frame.

$D'$ is a cross shaft journaled in the boards $C'$ and $C^2$ near the bottom.

$D^2$ and $D^3$ are sprocket gears secured to the shaft $D'$ to the inside of the side boards $C'$ and $C^2$.

$D^4$ and $D^5$ are sprocket wheels journaled on studs $D^6$ and $D^7$, and $D^8$ $D^9$ are sprocket chains connecting the wheels $D^2$ and $D^4$ and the wheels $D^3$ and $D^5$.

$D^{10}$ are cross bars extending between the chains $D^8$ and $D^9$. The reduced ends of the bars are journaled in lugs $D^{11}$ formed on links of the sprocket chain at suitable distances apart in the chain.

$D^{12}$ $D^{13}$ are arms connected to each end of the rods $D^{10}$, the arms $D^{12}$ extending obliquely rearwardly from the rod $D^{10}$ and the arms $D^{13}$ extending obliquely forwardly of the rods $D^{10}$. Both the arms $D^{12}$ and $D^{13}$ are provided with rollers $D^{14}$ which travel in the cam grooves $C^3$ and $C^4$.

$D^{15}$ are prongs forming part of the bars $D^{10}$.

$D^{16}$ is a flat bar supported on bracket $D^{17}$ secured to the side board $C^2$. The end of the cross bar $D^{10}$ rests on the bar $D^{16}$ during its oblique rearward movement. The weight of the sheaf as it is carried upwardly tends to tilt the prongs $D^{15}$ backwardly. The bar $D^{10}$ bearing on the bar $D^{16}$ and the roller of the arm $D^{13}$ bearing on the upper side of the groove $C^4$ prevents this.

The deck E is supported on the cross bars $E'$ and $E^2$ extending between the side boards $C'$ and $C^2$ to which they are secured.

The conveyer D is formed by an endless band F extending around rollers $F'$ located at each end of the conveyer. The rollers $F'$ are journaled between the timbers $A^5$ and $A^6$ of the main frame.

The conveyer E is formed with side bars $E^4$ secured to the timbers $A^5$ and $A^6$, cross boards $E^5$ and side boards $E^6$.

$E^7$ is a cross shaft journaled in the side bars $E^4$ in proximity to the top of the conveyer.

$E^{10}$ is a sprocket chain extending around the wheels $E^8$ and $E^9$.

$E^{11}$ are pronged conveyer bars secured at each end to the chains $E^{10}$.

$E^{12}$ are tail pieces forming part of the cross bars E. The tail pieces $E^{12}$ serve to keep the prongs of the pronged bars $E^{11}$ substantially perpendicular to the floor of the conveyer E during their upward movement.

$E^{13}$ are supporting braces for the conveyer.

We will now describe the means by which the elevator and conveyers are driven.

H is the main driving gear secured to the shaft $B'$ of the main supporting and driving wheel B.

$H'$ is a shaft journaled in the bearings $H^2$ formed on the bracket $H^3$.

$H^4$ is a pinion secured on the shaft $H'$ at one end and designed to mesh with the main gear H. I is a sprocket wheel secured to the opposite end of the shaft H′ and I′ is a sprocket pinion secured on the extended end of the shaft D′. I² is a sprocket chain connecting the wheel I and pinion I′. By this means as the machine is drawn in a forward direction the bars D¹⁰ are carried in the direction indicated by arrow.

J is a counter shaft secured in bearings J′ and J².

J³ is a bevel gear secured to the shaft H′.

J⁴ is a bevel pinion secured to the shaft J and designed to mesh with the bevel gear J³. J⁵ is a sprocket wheel also secured to the counter shaft J.

K is a sprocket gear secured to the extended end of the shaft E⁷ and K′ is a sprocket wheel secured to one spindle of one of the rollers F′ of the endless conveyer D. K⁴ is a sprocket chain extending around the wheel J⁵ and K′ and over the wheel K. By this means the conveyers D and E are revolved.

Having described the principal parts involved in our invention we shall briefly describe the operation of the same.

The machine is designed to be drawn in a forward direction alongside of the wagon to be loaded, with the conveyer E extending over the load. The several conveyers are driven from the main wheel as described.

The shocks or sheaves are picked up and elevated from the ground in the following manner. The prongs D¹⁵ of the rods D¹⁰ travel obliquely forwardly and with their points directed forwardly towards the ground so as to pierce the shock or sheaf. The rollers D¹⁴ of the arms D¹² and D¹³ coact with the lower portion of the grooves C³ and C⁴ during the movement. It will be seen that when the rollers have reached the lowermost portion of the grooves C³ and C⁴ that they follow the grooves in an upward curved direction around the shaft D′, the grooves being so formed that the prongs are gradually brought into a position perpendicular to the deck E. The prongs travel in this position in an oblique upward direction until the upper limit of the groove is reached. The grooves at this end are so formed that the rollers as they travel around the stud D⁷ hold the prongs in a perpendicular position as they pass over and around the upper edge of the deck E. By this motion the sheaf contacts with the edge of the deck E stripping the sheaf from off the prongs D¹⁵ as they descend. The prongs travel in this position until the roller of the arm D¹² reaches the depression 3 and the roller of the arm D¹³ reaches the upwardly inclined portion 4. The depression 3 and inclined portion 4 serve to turn the rod D¹⁰ so as to direct the prongs thereof again into a forward and downward direction when the operation is repeated.

By the use of two arms D¹² and D¹³ the prong is not only turned to travel in a forward direction at the point 3 and 4 but also prevents the same from turning backwardly at such points in the travel of the rollers along the groove as 5 and 6. It will be seen that if only the arms D¹² were used at the point 5 in the groove the arm D¹² would have a tendency to swing in a backward direction and so throw the point of the prong in a backward direction and away from the sheaf.

The sheaf after it has been stripped from the prongs D¹⁵ falls into the conveyer D. The conveyer D carries the sheaf laterally to the elevator E which elevates the sheaf onto the load.

From this description it will be seen that we have constructed a loader for shocks and sheaves which is light, simple and durable and which will effectually and automatically gather the shocks or sheaves off the ground and convey them onto the load. It will, of course, be understood that a device such as I describe may be used for loading various other commodities of a similar nature.

What we claim as our invention is:

In a shock loader, the combination with the main frame and supporting wheels, of an elevating carrier comprising side boards having grooves therein, the form of one of which is different from the opposite one, upper and lower sprocket wheels and connecting chains, pronged cross rods journaled on the links provided with arms coacting with the grooves in the side boards and a driving connection between the main supporting wheel and sprockets of the elevator carrier, as and for the purpose specified.

DAVID ALBERT STEWART.
JOHN FERGUSON STEWART.
ROBERT CHARLES STEWART.

Witnesses:
JAMES MORDEN CARTHEW.
MABEL GERALDINE BROWN.